(12) United States Patent
Salah

(10) Patent No.: US 12,550,142 B2
(45) Date of Patent: Feb. 10, 2026

(54) METHOD AND APPARATUS FOR CROSS-CARRIER SCHEDULING IN MOBILE COMMUNICATIONS

(71) Applicant: MediaTek Singapore Pte. Ltd., Singapore (SG)

(72) Inventor: Abdellatif Salah, Cambridge (GB)

(73) Assignee: MEDIATEK SINGAPORE PTE. LTD., Singapore (SG)

(*) Notice: Subject to any disclaimer, the term of this patent is extended or adjusted under 35 U.S.C. 154(b) by 320 days.

(21) Appl. No.: 18/262,793

(22) PCT Filed: Jan. 28, 2022

(86) PCT No.: PCT/CN2022/074580
§ 371 (c)(1),
(2) Date: Jul. 25, 2023

(87) PCT Pub. No.: WO2022/161459
PCT Pub. Date: Aug. 4, 2022

(65) Prior Publication Data
US 2024/0089963 A1 Mar. 14, 2024

Related U.S. Application Data

(60) Provisional application No. 63/142,516, filed on Jan. 28, 2021.

(51) Int. Cl.
*H04W 72/1273* (2023.01)
*H04W 72/0446* (2023.01)
(Continued)

(52) U.S. Cl.
CPC ... *H04W 72/1273* (2013.01); *H04W 72/0446* (2013.01); *H04W 72/21* (2023.01); *H04W 72/232* (2023.01)

(58) Field of Classification Search
CPC .......... H04W 72/0446; H04W 72/232; H04W 72/21; H04W 72/1273
(Continued)

(56) References Cited

U.S. PATENT DOCUMENTS

| 11,330,424 B2 | 5/2022 | Harada et al. |
| 11,700,621 B2 | 7/2023 | Xiong et al. |

(Continued)

FOREIGN PATENT DOCUMENTS

| CN | 109076527 A | 12/2018 |
| CN | 111903170 A | 11/2020 |

(Continued)

OTHER PUBLICATIONS

Extended European Search Report dated Oct. 21, 2024, issued in application No. EP 22745331.3.
(Continued)

*Primary Examiner* — Peter G Solinsky
(74) *Attorney, Agent, or Firm* — McClure, Qualey & Rodack, LLP

(57) ABSTRACT

Various solutions for cross-carrier scheduling with respect to user equipment and network apparatus in mobile communications are described. An apparatus may receive a physical downlink control channel (PDCCH) on a component carrier (CC) in a PUCCH cell group. The apparatus may receive downlink data on a physical downlink shared channel (PDSCH) on a CC in the PUCCH cell group scheduled by the PDCCH. The apparatus may receive a physical uplink control channel (PUCCH) carrier pattern semi-statically configured via a radio resource control (RRC) signal or dynamically configured via a downlink control information (DCI). The apparatus may transmit uplink control information (UCI) corresponding to the downlink data on a PUCCH on a CC according to the PUCCH carrier pattern.

20 Claims, 5 Drawing Sheets

(51) Int. Cl.
H04W 72/21 (2023.01)
H04W 72/232 (2023.01)

(58) Field of Classification Search
USPC .......................................................... 370/329
See application file for complete search history.

(56) References Cited

U.S. PATENT DOCUMENTS

| | | | | |
|---|---|---|---|---|
| 12,177,889 | B2 * | 12/2024 | Yi ..................... | H04W 72/0453 |
| 2012/0140743 | A1 * | 6/2012 | Pelletier ................ | H04W 76/15 |
| | | | | 370/335 |
| 2013/0242881 | A1 | 9/2013 | Wang et al. | |
| 2016/0302183 | A1 * | 10/2016 | Yang ..................... | H04L 5/0058 |
| 2017/0134140 | A1 * | 5/2017 | Park ..................... | H04L 5/0055 |
| 2019/0036665 | A1 * | 1/2019 | Park ..................... | H04L 5/0091 |
| 2021/0105673 | A1 * | 4/2021 | Jassal .................. | H04W 36/185 |
| 2021/0111780 | A1 * | 4/2021 | Zhou .................. | H04B 7/06964 |

FOREIGN PATENT DOCUMENTS

| | | | |
|---|---|---|---|
| EP | 4 033 687 B1 | 9/2024 | |
| EP | 4091256 B1 * | 5/2025 | ........... H04L 5/0092 |
| WO | WO-2022147492 A1 * | 7/2022 | ........... H04L 5/0053 |

OTHER PUBLICATIONS

NEC; "UE feedback enhancements for HARQ-ACK;" 3GPP TSG RAN WG! #104-e; Jan.-Feb. 2021; pp. 1-14.

Qualcomm Incorporated; "HARQ-ACK enhancement for IOT and URLLC;" 3GPP TSG RAN WG1 #104-e; Jan.-Feb. 2021; pp. 1-17.

International Search Report and Written Opinion dated Apr. 26, 2022-, issued in application No. PCT/CN2022/074580.

Mediatek Inc; "On UE feedback enhancements for HARQ-ACK;" 3GPP TSG RAN WG1 Meeting #104-e; R1-2100574; Jan. 2021; pp. 1-19.

* cited by examiner

METHOD AND APPARATUS FOR CROSS-CARRIER SCHEDULING IN MOBILE COMMUNICATIONS

CROSS REFERENCE TO RELATED PATENT APPLICATION(S)

The present disclosure is part of a non-provisional application claiming the priority benefit of U.S. Provisional Patent Application No. 63/142,516, filed 28 Jan. 2021, the content of which being incorporated by reference in its entirety.

TECHNICAL FIELD

The present disclosure is generally related to mobile communications and, more particularly, to dynamic and semi-static cross-carrier scheduling using PUCCH carrier pattern for latency enhancement and UCI transmission enhancement with respect to user equipment and network apparatus in mobile communications.

BACKGROUND

Unless otherwise indicated herein, approaches described in this section are not prior art to the claims listed below and are not admitted as prior art by inclusion in this section.

In Long-Term Evolution (LTE) or New Radio (NR), hybrid automatic repeat request-acknowledgement (HARQ-ACK) information transmission is introduced to improve transmission reliability and robustness. The user equipment (UE) needs to report HARQ-ACK information for corresponding downlink receptions in a HARQ-ACK codebook. The HARQ-ACK codebook should be transmitted in a slot indicated by a value of a HARQ feedback timing indicator field in a corresponding downlink control information (DCI) format. The DCI format should also indicate the physical uplink control channel (PUCCH) resource scheduled for the HARQ-ACK information transmission. HARQ-ACK multiplexing can be used to facilitate HARQ-ACK information transmission. Multiple HARQ-ACK feedbacks corresponding to multiple physical downlink shared channel (PDSCH) transmissions may be accumulated, multiplexed and transmitted to the network apparatus at once. One PUCCH resource may be used to carry multiple HARQ-ACK feedbacks to be transmitted in the same slot.

The current framework of transmission of HARQ feedback bits is not suitable for URLLC. URLLC is introduced for emerging applications that demands high requirements on end-to-end latency and reliability. A general URLLC requirement is that a packet of size 32 bytes shall be transmitted within 1 millisecond end-to-end latency with a success probability of $10^{-5}$. URLLC traffic is typically sporadic and short whereas low-latency and high-reliability requirements are stringent. For example, the control reliability of URLLC has to be stricter than the data reliability which is up to $10^{-6}$ BLER. Accordingly, allowing only one PUCCH resource for HARQ feedback bits transmission in an uplink slot will add to transmission latency.

On the other hand, multi-link operation is introduced to increase system capacity and transmission efficiency of the communication systems. Multi-link operation can be implemented by carrier aggregation (CA) or dual connectivity (DC), where additional links are used to increase the amount of data that can be transferred to and from the UE. The UE can be configured with more than one radio links (e.g., component carriers) and can connect to more than one network nodes (e.g., serving cells). Under the framework of CA, cross-carrier scheduling is supported to improve transmission efficiency and reduce latency. Cross-carrier scheduling enables the UE to connect to different network nodes for receiving the downlink data on different carriers. Cross-carrier scheduling may also be used to balance the loads from traffic and scheduling across different component carriers. Without cross-carrier scheduling, the downlink scheduling assignments on physical downlink control channel (PDCCH) are only valid for the component carrier (CC) on which they were transmitted. With cross-carrier scheduling, the downlink scheduling assignments can be received on a CC other than the one on which PDCCH is received.

However, in current NR framework, cross-carrier scheduling for uplink control information (UCI) transmission (e.g., PUCCH) is not supported. In $3^{rd}$ Generation Partnership Project (3GPP) Release-16, PUCCH carrier is configured to a single cell within a PUCCH cell group. In a time division duplex (TDD) system, the uplink/downlink TDD pattern is the bottleneck for the URLLC latency. TDD allows uplink and downlink to use the entire frequency spectrum, but in different time slots. Time is divided up into short slots and some are designated for uplink while others are designated for downlink. This approach enables asymmetric traffic and time-varying uplink and downlink demands. However, since PUCCH can only be scheduled in uplink slots, in an event that TDD pattern allocate more slots as downlink slots, the duration between uplink slots will be drawn too long and cause long latency. The worst case PUCCH alignment delay is dominated by the length of downlink and uplink and may be prohibitive to apply URLLC retransmission. Therefore, there is a need to introduce cross-carrier scheduling on PUCCH transmission and enhance UCI transmission for URLLC.

Accordingly, how to reduce alignment delay/latency and enhance reliability is an important issue for URLLC or other latency-critical applications in the newly developed wireless communication network. Therefore, there is a need to provide proper cross-carrier scheduling mechanisms and UCI transmission enhancement for better performance when URLLC is supported.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to dynamic and semi-static cross-carrier scheduling for latency enhancement and UCI transmission enhancement with respect to user equipment and network apparatus in mobile communications.

In one aspect, a method may involve an apparatus receiving a PDCCH on a CC in a PUCCH cell group. The method may also involve the apparatus receiving a PDSCH on a CC in the PUCCH cell group scheduled by the PDCCH. The method may further involve the apparatus receiving a PUCCH carrier pattern semi-statically configured via a RRC signal or dynamically configured via a DCI. The method may further involve the apparatus transmitting UCI corresponding to the downlink data on a PUCCH on a CC according to the PUCCH carrier pattern.

In one aspect, a method may involve an apparatus receiving downlink data on a CC. The method may also involve the apparatus receiving a PUCCH carrier pattern on the CC via a semi-static configuration or a dynamic and semi-static configuration. The method may further involve the apparatus performing a PUCCH carrier switching according to the PUCCH carrier pattern when transmitting UCI corresponding to the downlink data.

In one aspect, an apparatus may include a transceiver and a processor coupled to the transceiver. The transceiver may be configured to wirelessly communicate with a network node of a wireless network. The processor may be configured to receive, via the transceiver, a PDCCH on a CC in a PUCCH cell group. The processor may also be configured to receive, via the transceiver, downlink data on a PDSCH on a CC in the PUCCH cell group scheduled by the PDCCH. The processor may be further configured to receive, via the transceiver, a PUCCH carrier pattern semi-statically configured via a RRC signal or dynamically configured via a DCI. The processor may be further configured to transmit, via the transceiver, UCI corresponding to the downlink data on a PUCCH on a CC according to the PUCCH carrier pattern.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT), Narrow Band Internet of Things (NB-IoT), Industrial Internet of Things (IIoT), and 6th Generation (6G), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Figure 1:
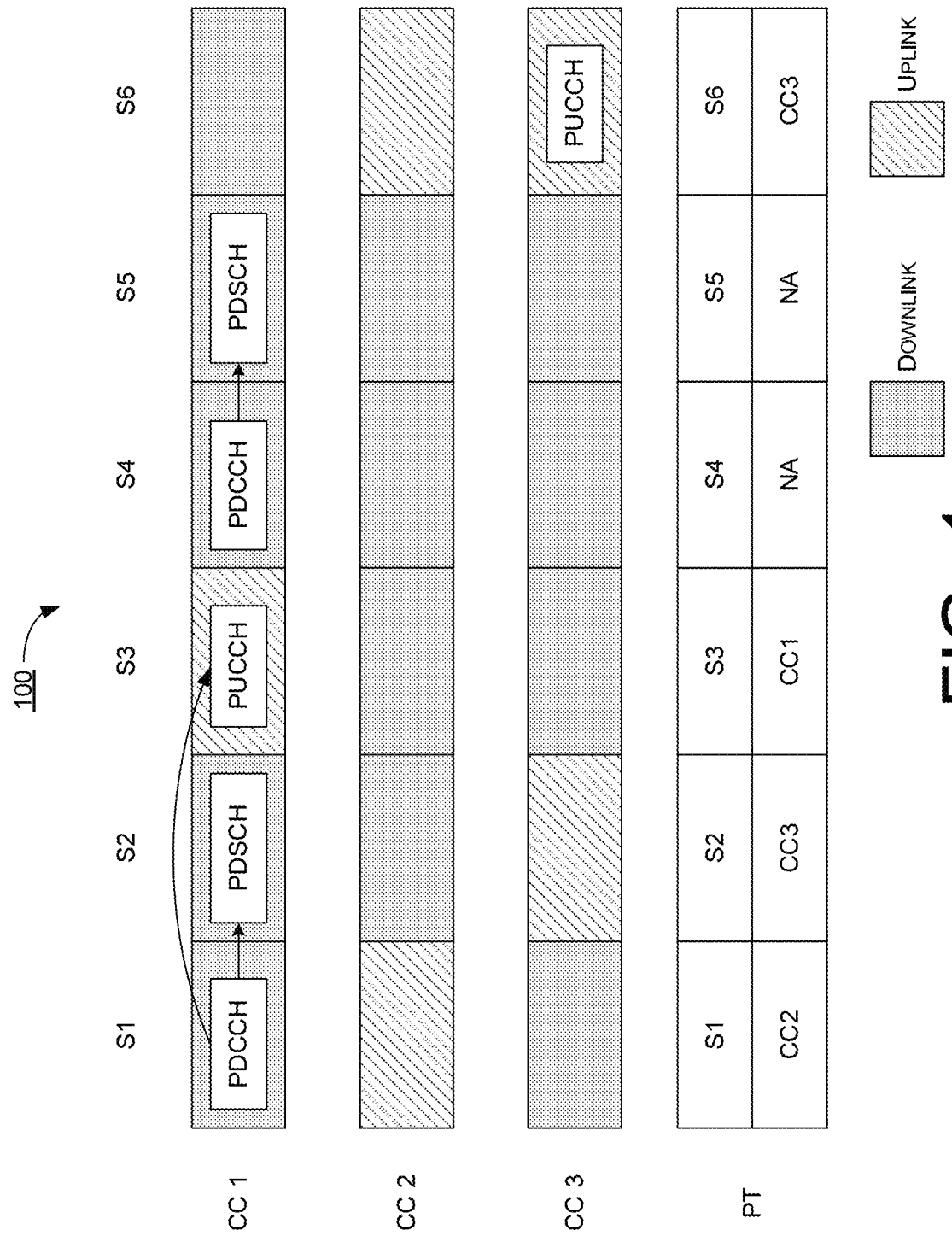
FIG. 1 is a diagram depicting an example scenario under schemes in accordance with implementations of the present disclosure.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to semi-static and dynamic cross-carrier scheduling for latency enhancement with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

In current NR framework, cross-carrier scheduling for UCI transmission (e.g., PUCCH) is not supported. In 3GPP Release-16, PUCCH carrier is configured to a single cell within a PUCCH cell group. In a TDD system, the uplink/downlink TDD pattern is the bottleneck for the URLLC latency. TDD allows uplink and downlink to use the entire frequency spectrum, but in different time slots. Time is divided up into short slots and some are designated for uplink while others are designated for downlink. This approach enables asymmetric traffic and time-varying uplink and downlink demands. However, since PUCCH can only be scheduled in uplink slots, in an event that TDD pattern allocate more slots as downlink slots, the duration between uplink slots will be drawn too long and cause long latency. The worst case PUCCH alignment delay is dominated by the length of downlink and uplink and may be prohibitive to apply URLLC retransmission. Therefore, there is a need to introduce cross-carrier scheduling on PUCCH transmission and enhance UCI transmission for URLLC or other latency-critical applications.

In view of the above, the present disclosure proposes a number of schemes pertaining to dynamic and semi-static cross-carrier scheduling for latency enhancement and UCI transmission enhancement with respect to the UE and the network apparatus. According to the schemes of the present disclosure, a CA system of TDD carriers with an appropriate time offset between uplink slots on different CCs is supported. The UE can be configured with dynamic and semi-static cross-carrier scheduling for PUCCH. Switching of CC used for PUCCH can help to reduce the latency for CA with two or multiple carriers having different TDD patterns. Accordingly, by applying the schemes of the present disclosure, the performance of UCI transmission can be improved to reduce alignment delay/latency. Applications with URLLC requirements can benefit from the enhancements achieved by the implementations of the present disclosure.

FIG. 1 illustrates example scenario 100 under schemes in accordance with implementations of the present disclosure. Scenario 100 involves a UE and a plurality of network nodes, which may be a part of a wireless communication network (e.g., an LTE network, a 5G network, an NR network, an IoT network or an NB-IoT network). Scenario 100 illustrates an example of semi-static cross-carrier scheduling for PUCCH. The UE may be configured with a plurality of CCs such as a first CC (e.g., CC 1), a second CC (e.g., CC 2), and a third CC (e.g., CC 3). The first CC, the second CC, and the third CC may have identical or different TDD patterns for uplink/downlink slots. For example, the ration of downlink slot to uplink slot is 3:1 for CC 1, 4:1 for CC 2, and 3:1 for CC 3. To reduce the alignment delay, the UE may be configured with semi-static switching of CC used for PUCCH.

Specifically, the UE may receive a PDCCH on the first CC in a PUCCH cell group. The PDCCH may schedule a PDSCH on the first CC. The UE may receive downlink data on the PDSCH on the first CC scheduled by the PDCCH. Then, the UE may further receive a PUCCH carrier pattern on the first CC via a semi-static configuration or a dynamic configuration. The network node may define the PUCCH carrier pattern and semi-statically signal the PUCCH carrier pattern to the UE via a radio resource control (RRC) signal or dynamically signal the PUCCH carrier pattern to the UE via downlink control information (DCI).

To reduce latency, the PUCCH may be scheduled on another CC (e.g., second CC or third CC) different from the first CC. The PUCCH carrier pattern may indicate scheduled PUCCH carrier for transmitting the UCI. For example, the PUCCH carrier pattern configures CC 2 that is available for transmitting UCI in first slot S1, configures CC 3 that is available for transmitting UCI in second slot S2, configures CC 1 that is available for transmitting UCI in third slot S3, and configures CC 3 that is available for transmitting UCI in sixth slot S6. Among CC 1, CC 2, and CC 3, there is no uplink slot configured in the fourth slot S4 and the fifth slot S5, so the PUCCH carrier pattern does not indicate any CC in the fourth slot S4 and the fifth slot S5. The DCI may indicate which slot to transmit the UCI. Therefore, the UE will know which CC is used for PUCCH transmission, and transmit the UCI (e.g., HARQ-ACK) corresponding to the downlink data on the PUCCH on the second CC according to the PUCCH carrier pattern. The UE may perform a PUCCH carrier switching, from the first CC to the second CC or to the third CC, when transmitting UCI corresponding to the downlink data.

In some implementations, the UE may receive downlink data on the PDSCH on another CC (e.g., second CC or third CC) different from first CC in the PUCCH cell group scheduled by the PDCCH. Therefore, the PUCCH may be scheduled on another CC different from the CC that the downlink data has been received. In an event that the UE receives downlink data on the second CC, the PUCCH may be scheduled on the first CC or the third CC within the PUCCH cell group. In an event that the UE receives downlink data on the third CC, the PUCCH may be scheduled on the first CC or the second CC within the PUCCH cell group.

The PUCCH carrier pattern configures multiple CCs to use for PUCCH transmission. Some restrictions on the number of selectable CC could apply. For example, only a pre-determined number of CCs (e.g., K=3 CCs) could be used to transmit the UCI. The UE may receive the PUCCH carrier pattern (e.g., via RRC configuration or DCI indication) configuring the first CC (e.g., CC 1), the second CC (e.g., CC 2), and the third CC (e.g., CC 3) within the PUCCH cell group that can be used to transmit the UCI. For example, appointing multiple serving cells within PUCCH cell group to use for PUCCH may be supported (e.g., per PDSCH-ServingCell configuration). PUCCH-Cell field of PDSCH-ServingCellConfig should be allowed to list at most K elements of ServCellIndex. The UCI carried by the PUCCH is independent from the CC selected for PUCCH transmission (e.g., CC 2). For different PUCCH cell groups, a single PUCCH carrier pattern is configured per PUCCH cell group.

In some implementations, the PUCCH carrier pattern may configure the first CC and the second CC within one cell group, and the third CC may be configured in another cell group. In an event that the PUCCH carrier switching is allowed within the same cell group and no PUCCH carrier switching allowed across cell groups, the PUCCH carrier pattern may be configured with the first CC and the second CC for transmitting UCI. In an event that PUCCH carrier switching across cell groups is allowed, the PUCCH carrier pattern may configured with the first CC, the second CC, and the third CC of different cell groups for transmitting UCI. PUCCH carrier switching across cell groups is configurable to the UE (e.g. via RRC). PUCCH carrier pattern used for the UCI transmission may reduce the latency for carrier aggregation operated within two or multiple inter-band carriers having different TDD pattern.

In some implementations, the PUCCH carrier pattern may configure a primary cell (PCell) and a secondary cell (SCell) with the PUCCH cell group that can be used to transmit the PUCCH.

The PUCCH carrier pattern is configured in the time domain. In other words, the PUCCH carrier pattern is a time pattern. A plurality of slots are configured in the time domain. The PUCCH cell group may have two cells that are PUCCH carriers (e.g. primary cell (PCell) and secondary cell (SCell)). The UE could be signaled with the PUCCH carrier pattern based on slots, and the PUCCH carrier pattern indicates one of the PCell and the SCell for at least one of the slots. For instance, PUCCH carrier pattern [S, P, P, S, P] means using SCell for PUCCH transmission on the first slot, using PCell for PUCCH transmission on the second slot, using PCell for PUCCH transmission on the third slot, using SCell for PUCCH transmission on the fourth slot, and using PCell for PUCCH transmission on the fifth slot.

In some implementations, the PUCCH carrier pattern indicates one of the first CC, the second CC, and the third CC for at least one of the slots. The PUCCH carrier pattern defines one of the PCell/PSCell/PUCCH-SCell for each of the slots, so each of the slots is mapping to one of the PCell and the SCell. Specifically, in the first CC, the second CC, and the third CC, each of the slots may configured as uplink slot or downlink slot, uplink resources may be scheduled in the uplink slot, and downlink resources may be scheduled in the downlink sot. Each of uplink slots and its corresponding CC will be configured in the PUCCH carrier pattern for PUCCH transmission. However, among the first CC, the second CC, and the third CC, if there are two or more uplink slots are configured in the same slot, only one of them will be configured in the PUCCH carrier pattern. Even if the UE knows there are two or more CCs can be used for transmitting the UCI in the same slot, the UE may only transmit UCI in the uplink slot and its corresponding CC that is pre-determined in the PUCCH carrier pattern.

In some implementations, the PUCCH carrier pattern may be configured with periodicity. For example, the UE may receive the PUCCH carrier pattern periodically. Each of the received PUCCH carrier pattern may remain the same as previous received PUCCH carrier pattern. In other embodiments, each of the received PUCCH carrier pattern may have different time pattern, length, and the number of CCs from previous received PUCCH carrier pattern. For another example, the UE may receive a configuration configuring the PUCCH carrier pattern and a period for applying the PUCCH carrier pattern. Then, the UE may apply the PUCCH carrier pattern periodically for transmitting UCI based on the received PUCCH carrier pattern and predetermined period until receiving another PUCCH carrier pattern from the network node. The periodicity and length of the PUCCH carrier pattern for semi-static PUCCH carrier switching may directly be determined by the RRC configuration of the time domain pattern pucchCellPattern.

In some implementations, the length of the PUCCH carrier pattern may be variable from 1 to maximum number of the slots in a frame. Specifically, slot length gets different depending on numerology, and numerology indicates subcarrier spacing type. For normal cyclic prefix (CP) and slot configuration 0, if numerology is 0, the corresponding subcarrier spacing is 15 kHz, and the slot length is 1 ms. If numerology is 1, the corresponding subcarrier spacing is 30 kHz, and the slot length is 0.5 ms. If numerology is 2, the corresponding subcarrier spacing is 60 kHz, and the slot length is 0.25 ms. If numerology is 3, the corresponding subcarrier spacing is 120 kHz, and the slot length is 0.125 ms. If numerology is 4, the corresponding subcarrier spacing is 240 kHz, and the slot length is 0.0625 ms. Therefore, slot length gets shorter as subcarrier spacing gets wider. Thus, minimum length (i.e., one slot) of the PUCCH carrier pattern may get shorter as subcarrier spacing gets wider, and maximum length (i.e., one frame) of the PUCCH carrier pattern may be the same at different subcarrier spacing.

In some implementations, the first CC, the second CC, and the third CC may be configured with different numerologies. In an event that the numerology of the CC for receiving PDCCH and downlink data is different from the numerology of the CC for transmitting UCI, timing offsets in the scheduling assignment, for example, which slot the assignment relates to, are interpreted in the PDSCH numerology.

In some implementations, the PCell and the SCell may be configured with different numerologies. In an event that the numerology of the PUCCH cell (e.g., PCell) for receiving PDCCH and downlink data is different from the numerology of the PUCCH cell (e.g., SCell) for transmitting UCI, timing offsets in the scheduling assignment, for example, which slot the assignment relates to, are interpreted in the PDSCH numerology.

In some implementations, the PUCCH carrier pattern may be configured at slot granularity. The minimum scheduling time granularity of the PUCCH carrier pattern is one slot of the PCell/PSCell/PUCCH-SCell. The length of slot in time varies depending on numerology. As mentioned above, slot length gets shorter as subcarrier spacing gets wider. Therefore, in perspective of the slot length, the slot granularity gets smaller as subcarrier spacing gets wider. In most numerology, minimum time scheduling granularity of NR is much smaller than 1 ms.

In an event that the PUCCH carrier pattern carried in DCI, the DCI may further indicate which slot is used for transmitting the UCI. This behaviour may be signalled by K1 index/value, or any other affordable way to signal 1 bit. K1 value points to the slot on which the PUCCH is going to be transmitted. However, with the PUCCH carrier changing, the unit of K1 needs to be clarified.

Specifically, K1 is PDSCH-to-HARQ_feedback timing indicator. The PDSCH-to-HARQ-timing-indicator field values provided in the DCI message map to values for a set of number of slots provided by higher layer parameter dl-DataToUL-ACK under PUCCH-Config in RRC Reconfig message (K1 Value). For PUCCH carrier switching based on PUCCH carrier pattern via semi-static configuration or dynamic configuration, K1 value needs to be interpreted based on the numerology of the CC for UCI transmission.

Figure 2:
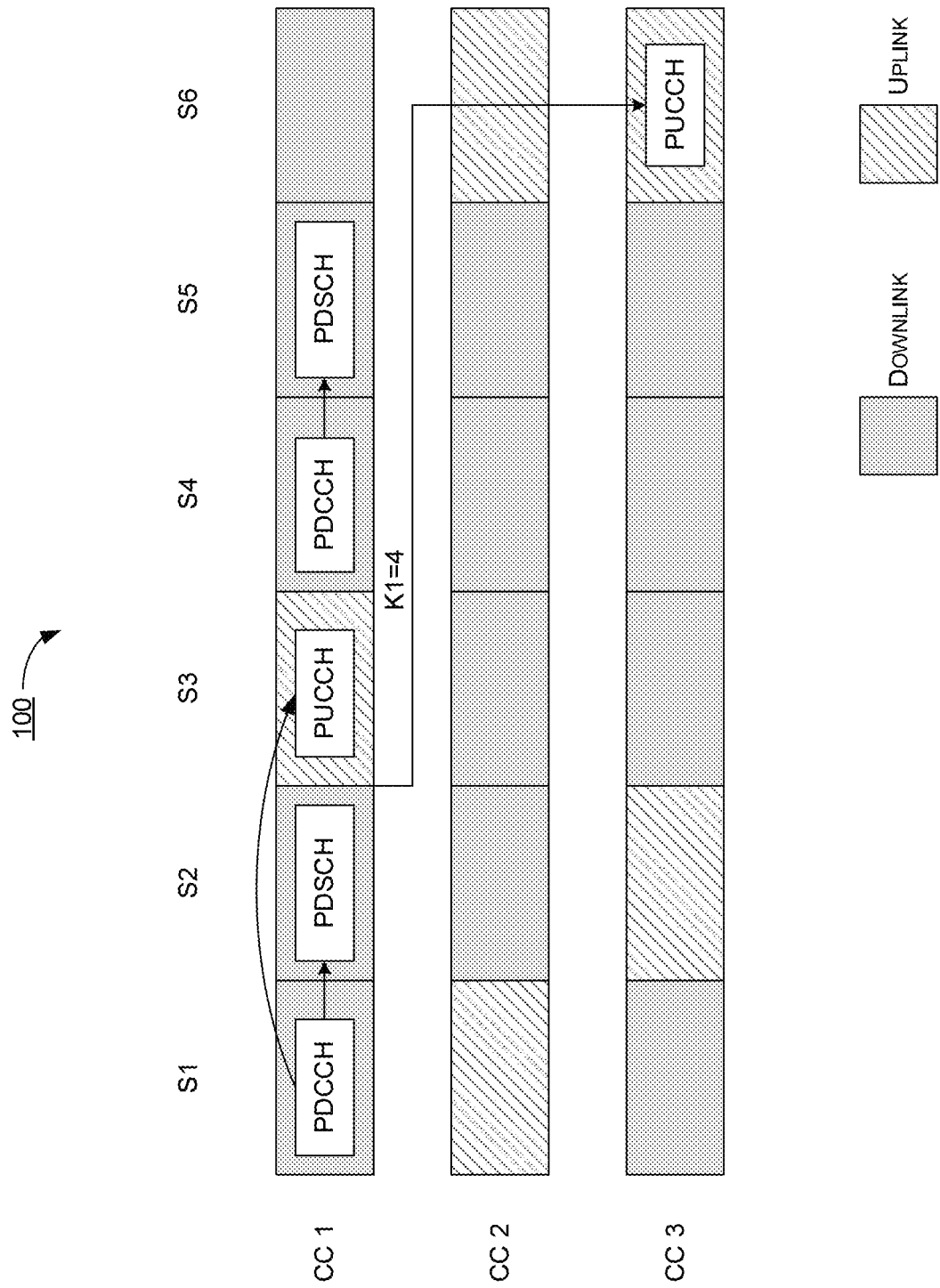
FIG. 2 is a diagram depicting an example scenario under schemes in accordance with implementations of the present disclosure.

For example, reference is made to FIG. 2, FIG. 2 is a diagram depicting an example scenario under schemes in accordance with implementations of the present disclosure. In FIG. 2, PDSCH is received in the second slot S2. K1 value is 4 which means the UCI needs to be transmitted in the fourth slot (i.e., the sixth slot S6) after the second slot S2.

K1 granularity is determined based on the CC on which the DCI has been received. For example, reference is made to FIG. 1, the UE may receive DCI on PDCCH on CC1, and the unit of K1 granularity may be one slot. The slot length gets shorter as subcarrier spacing gets wider. Therefore, in perspective of the slot length, the K1 granularity gets smaller as subcarrier spacing gets wider. Thus, the K1 granularity may be determined based on the slot length of the CC1.

In another embodiment, K1 granularity is determined based on the CC on which the PDSCH transmission has been received. In most situation, the PDSCH may be received on the same CC as the DCI has been received. Therefore, K1 granularity determined based on the CC on which the PDSCH transmission has been received may be the same as K1 granularity determined based on the CC on which the DCI has been received.

In another embodiment, K1 granularity is determined based on the smallest or the largest SCS among the PUCCH carriers within the PUCCH cell group. For example, reference is made to FIG. 1, Assuming that the SCS of the first CC (e.g., CC 1) is 15 kHz, the SCS of the second CC (e.g., CC 2) is 30 kHz, and the SCS of the third CC (e.g., CC 3) is 120 kHz, in an event that K1 granularity is determined based on the smallest SCS, K1 granularity may be one slot length 1 ms with the 15 kHz SCS. In an event that K1 granularity is determined based on the largest SCS, K1 granularity may be one slot length 0.125 ms with 120 kHz SCS.

In another embodiment, K1 granularity is configured to the UE via RRC signal or DCI (e.g., to use the PCell or another SCell granularity). The set of values of K1 may be defined per PUCCH cell group. In some implementations, the set of values of K1 may be defined per PUCCH cell group with the largest SCS of PUCCH carriers as a granularity reference.

The UE may scan the PUCCH carrier according to some defined rules to select the carrier on which the PUCCH is taking place. If the scan fails and no carrier is available, the UE may not expect to receive K1 pointing to a slot where PUCCH resources are not available on any PUCCH carrier. In another embodiment, if the scan fails and no carrier is available, the UE may cancel PUCCH transmission if the received K1 is pointing to a slot on which PUCCH resources are not available on any PUCCH carrier. In another embodiment, if the scan fails and no carrier is available, the UE may postpone PUCCH transmission if the received K1 is pointing to a slot on which PUCCH resources are not available on any PUCCH carrier. In another embodiment, flexible symbols within slots are not considered for PUCCH transmission. However, in order to further reduce latency, flexible symbols use for PUCCH transmission is configurable (e.g. via RRC signal).

Order of PUCCH carriers to be selected is defined according to some rules that could be semi-statically defined. Specifically, the carriers order is semi-statically configured to the UE, and PCell could be always ranked as first priority. The carriers order is determined implicitly determined by the UE according to some rules or criterions. For example, carrier with most UL opportunities and carrier with largest SCS may have higher priority. In some implementations, the PUCCH carrier could be determined by the UE using some available information like the UCI payload and/or PUCCH resource and/or K1. If multiple carriers verify all the conditions for PUCCH carrier selection, the carrier with the lowest or the highest index may be selected.

In some implementations, if PUCCH resource on the selected PUCCH carrier is overlapping with PUSCH(CG/DG) SRS/PRACH/SR transmission and intra-UE multiplexing rules need to be applied on the selected carrier according to the defined rules, the UE could be configured with the possibility to change the PUCCH carrier to avoid the intra-UE multiplexing. Intra-UE multiplexing could be taken into consideration when selecting the PUCCH carrier. For example, if intra-UE multiplexing is needed on the PUCCH carrier then PUCCH carrier deprioritized or not selected or its priority in the priority list is changed and for example the next PUCCH carrier is selected. Intra-UE multiplexing rules could be restricted to some PUCCH carriers. For example, PCell only. PUCCH carrier priority list could be changed/amended by the UE according to the intra-UE multiplexing instances. For example, PUCCH carriers on which intra-UE multiplexing is needed are relegated to lower priority in the list.

Illustrative Implementations

Figure 3:
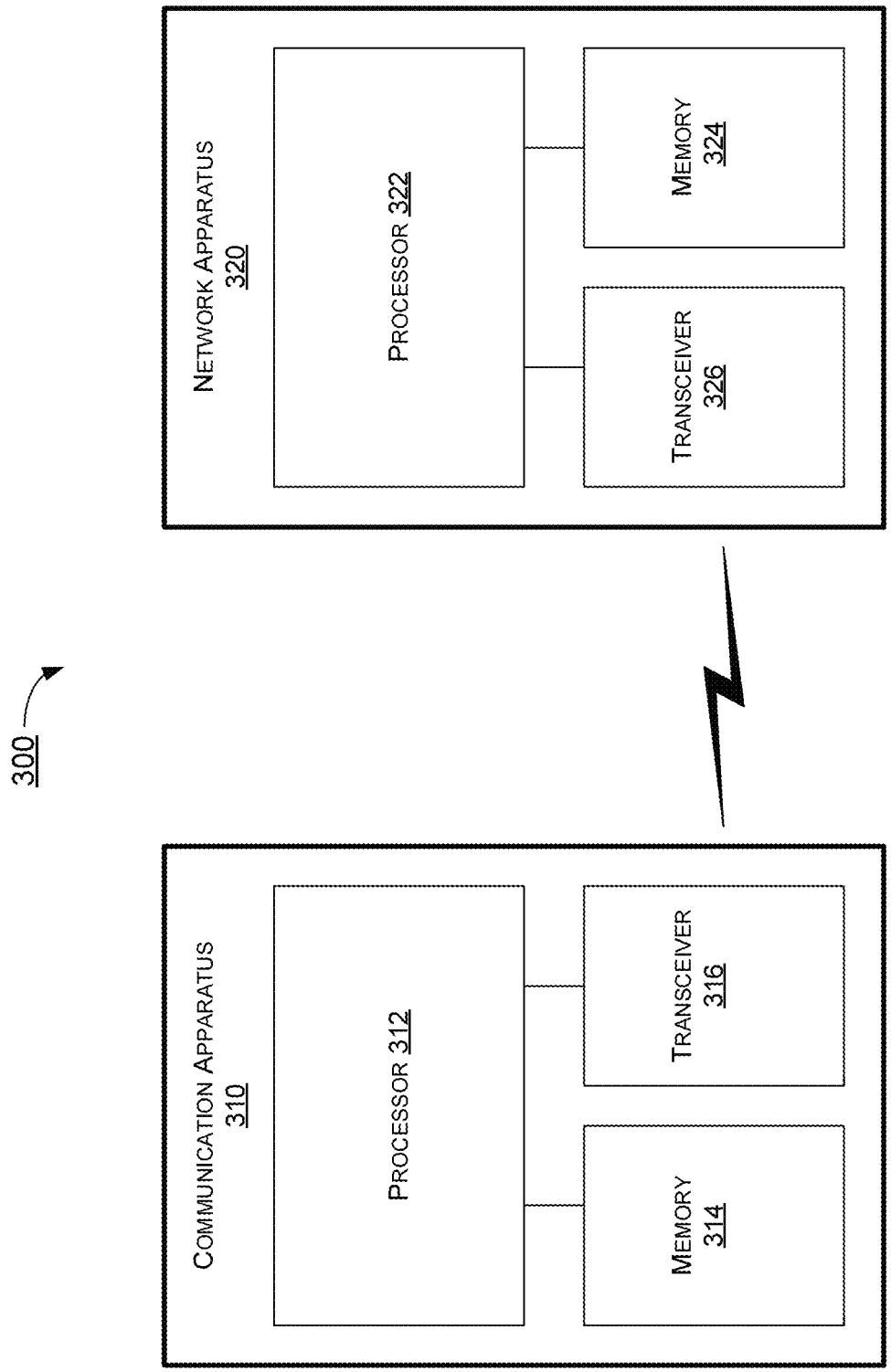
FIG. 3 is a block diagram of an example communication system in accordance with an implementation of the present disclosure.

FIG. 3 illustrates an example communication system 300 having an example communication apparatus 310 and an example network apparatus 320 in accordance with an implementation of the present disclosure. Each of communication apparatus 310 and network apparatus 320 may perform various functions to implement schemes, techniques, processes and methods described herein pertaining to semi-static and dynamic cross-carrier scheduling for latency enhancement and UCI transmission enhancement with respect to user equipment and network apparatus in wireless communications, including scenarios/schemes described above as well as processes 400 and 500 described below.

Communication apparatus 310 may be a part of an electronic apparatus, which may be a UE such as a portable or mobile apparatus, a wearable apparatus, a wireless communication apparatus or a computing apparatus. For instance, communication apparatus 310 may be implemented in a smartphone, a smartwatch, a personal digital assistant, a digital camera, or a computing equipment such as a tablet computer, a laptop computer or a notebook computer. Communication apparatus 310 may also be a part of a machine type apparatus, which may be an IoT, NB-IoT, or IIoT apparatus such as an immobile or a stationary apparatus, a home apparatus, a wire communication apparatus or a computing apparatus. For instance, communication apparatus 310 may be implemented in a smart thermostat, a smart fridge, a smart door lock, a wireless speaker or a home control center. Alternatively, communication apparatus 310 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 310 may include at least some of those components shown in FIG. 3 such as a processor 312, for example. Communication apparatus 310 may further include one or more other components not pertinent to the proposed scheme of the present disclosure (e.g., internal power supply, display device and/or user interface device), and, thus, such component(s) of communication apparatus 310 are neither shown in FIG. 3 nor described below in the interest of simplicity and brevity.

Network apparatus 320 may be a part of an electronic apparatus, which may be a network node such as a base station, a small cell, a router or a gateway. For instance, network apparatus 320 may be implemented in an eNodeB in an LTE, LTE-Advanced or LTE-Advanced Pro network or in a gNB in a 5G, NR, IoT, NB-IoT or IIoT network. Alternatively, network apparatus 320 may be implemented in the form of one or more IC chips such as, for example and without limitation, one or more single-core processors, one or more multi-core processors, or one or more RISC or CISC processors. Network apparatus 320 may include at least some of those components shown in FIG. 3 such as a processor 322, for example. Network apparatus 320 may further include one or more other components not pertinent to the proposed scheme of the present disclosure (e.g., internal power supply, display device and/or user interface device), and, thus, such component(s) of network apparatus 320 are neither shown in FIG. 5 nor described below in the interest of simplicity and brevity.

In one aspect, each of processor 312 and processor 322 may be implemented in the form of one or more single-core processors, one or more multi-core processors, or one or more CISC processors. That is, even though a singular term "a processor" is used herein to refer to processor 312 and processor 322, each of processor 312 and processor 322 may include multiple processors in some implementations and a single processor in other implementations in accordance with the present disclosure. In another aspect, each of processor 312 and processor 322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 312 and processor 322 is a special-purpose machine specifically designed, arranged and configured to perform specific tasks including semi-static and dynamic cross-carrier scheduling for latency enhancement with respect to user equipment and network apparatus in mobile communications in accordance with various implementations of the present disclosure.

In some implementations, communication apparatus 310 may also include a transceiver 316 coupled to processor 312 and capable of wirelessly transmitting and receiving data. In some implementations, communication apparatus 310 may further include a memory 314 coupled to processor 312 and capable of being accessed by processor 312 and storing data therein. In some implementations, network apparatus 320 may also include a transceiver 326 coupled to processor 322 and capable of wirelessly transmitting and receiving data. In some implementations, network apparatus 320 may further include a memory 324 coupled to processor 322 and capable of being accessed by processor 322 and storing data therein. Accordingly, communication apparatus 310 and network apparatus 320 may wirelessly communicate with each other via transceiver 316 and transceiver 326, respectively. To aid better understanding, the following description of the operations, functionalities and capabilities of each of communication apparatus 310 and network apparatus 320 is provided in the context of a mobile communication environment in which communication apparatus 310 is implemented in or as a communication apparatus or a UE and network apparatus 320 is implemented in or as a network node of a communication network.

In some implementations, processor 312 may receive, via transceiver 316, a PDCCH on a CC in a PUCCH cell group. The PDCCH may schedule a PDSCH on a CC the same as or different from the CC that the PDCCH has been received. Processor 312 may receive, via transceiver 316, downlink data on the PDSCH on the CC in the PUCCH cell group scheduled by the PDCCH. Then, processor 312 may further receive a PUCCH carrier pattern semi-statically configured via a radio resource control (RRC) signal or dynamically configured via downlink control information (DCI). The processor 312 may perform a PUCCH carrier switching, from the first CC to the second CC, and transmit UCI corresponding to the downlink data on the PUCCH on the CC according to the PUCCH carrier pattern.

In some implementations, the PUCCH carrier pattern is configured by the network apparatus 320. The PUCCH carrier pattern configures the first CC and the second CC within a PUCCH cell group that can be used to transmit the UCI.

In some implementations, the PUCCH carrier pattern configures a primary cell (PCell) and a secondary cell (SCell) within the PUCCH cell group that can be used to transmit the PUCCH.

In some implementations, the PUCCH carrier pattern is configured in a time domain, and a plurality of slots are configured in the time domain. The PUCCH carrier pattern indicates one of the first CC and the second CC for at least one of the slots. In some implementations, the PUCCH carrier pattern indicates one of the PCell and the SCell for at least one of the slots.

In some implementations, each of the slots is mapping to one of the PCell and the SCell.

In some implementations, a length of the PUCCH carrier pattern is variable from 1 to a maximum number of the slots.

In some implementations, the PCell and the SCell are configured with different numerologies.

In some implementations, the PUCCH carrier pattern is configured at a slot granularity.

In some implementations, the first CC and the second CC are configured with different numerologies.

In some implementations, the PUCCH carrier pattern is configured with periodicity.

Illustrative Processes

Figure 4:
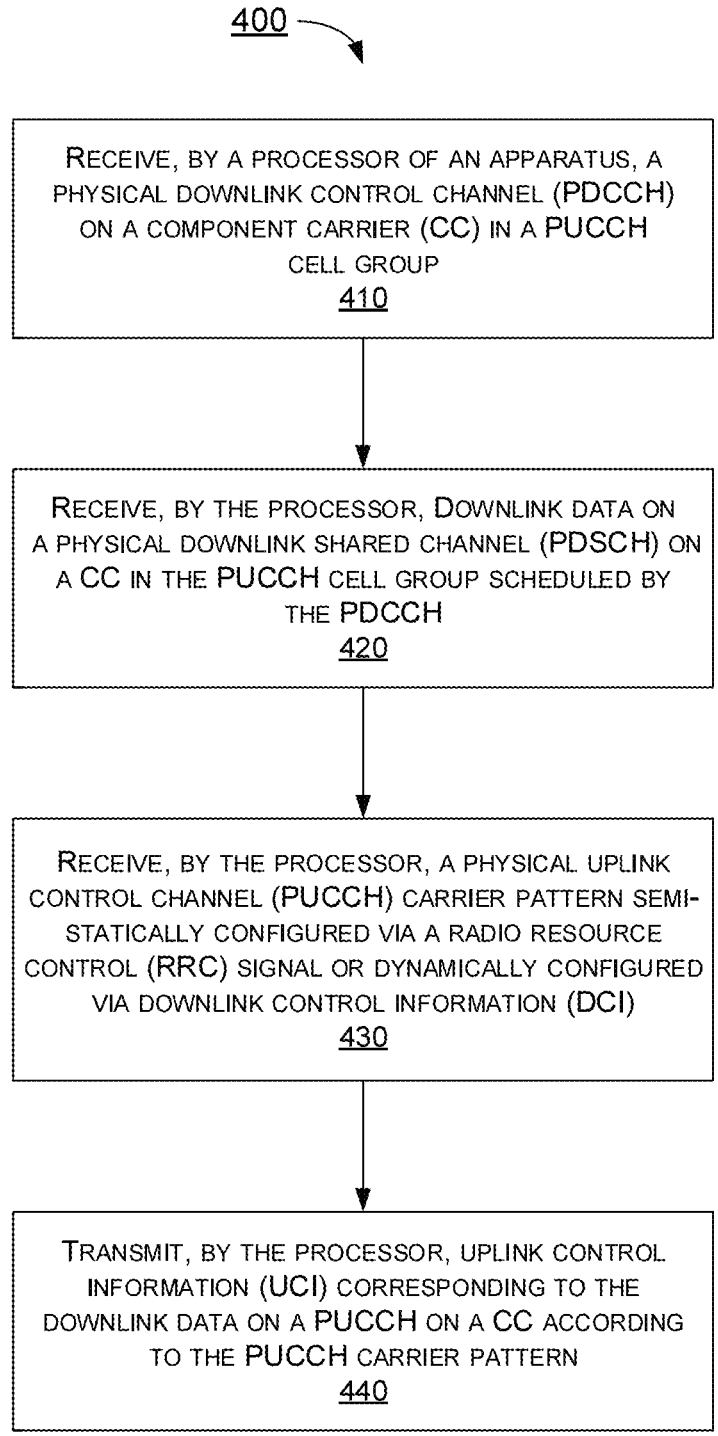
FIG. 4 is a flowchart of an example process in accordance with an implementation of the present disclosure.

FIG. 4 illustrates an example process 400 in accordance with an implementation of the present disclosure. Process 400 may be an example implementation of schemes described above, whether partially or completely, with respect to dynamic cross-carrier scheduling for latency enhancement with the present disclosure. Process 400 may represent an aspect of implementation of features of communication apparatus 310. Process 400 may include one or more operations, actions, or functions as illustrated by one or more of blocks 410, 420, 430 and 440. Although illustrated as discrete blocks, various blocks of process 400 may be divided into additional blocks, combined into fewer blocks, or eliminated, depending on the desired implementation. Moreover, the blocks of process 400 may executed in the order shown in FIG. 4 or, alternatively, in a different order. Process 400 may be implemented by communication apparatus 310 or any suitable UE or machine type devices. Solely for illustrative purposes and without limitation, process 400 is described below in the context of communication apparatus 310. Process 400 may begin at block 410.

At block 410, process 400 may involve processor 312 of apparatus 310 receiving a PDCCH on a CC in a PUCCH cell group. Process 400 may proceed from block 410 to block 420.

At block 420, process 400 may involve processor 312 receiving downlink data on a PDSCH on a CC in the PUCCH cell group scheduled by the PDCCH. Process 400 may proceed from block 420 to block 430.

At block 430, process 400 may involve processor 312 receiving PUCCH carrier pattern semi-statically configured via a RRC signal or dynamically configured via DCI. Process 400 may proceed from block 430 to block 440.

At block 440, process 400 may involve processor 312 transmitting UCI corresponding to the downlink data on a PUCCH on a CC according to the PUCCH carrier pattern.

In some implementations, the PUCCH carrier pattern configures the first CC and the second CC within a cell group that can be used to transmit the UCI.

In some implementations, the PUCCH carrier pattern configures a primary cell (PCell) and a secondary cell (SCell) within the PUCCH cell group that can be used to transmit the PUCCH.

In some implementations, the PUCCH carrier pattern is configured in a time domain.

In some implementations, a plurality of slots are configured in the time domain, and the PUCCH carrier pattern indicates one of the first CC and the second CC for at least one of the slots. In some implementations, the PUCCH carrier pattern indicates one of the PCell and the SCell for at least one of the slots.

In some implementations, each of the slots is mapping to one of the PCell and the SCell.

In some implementations, a length of the PUCCH carrier pattern is variable from 1 to a maximum number of the slots.

In some implementations, the PCell and the SCell are configured with different numerologies.

In some implementations, the PUCCH carrier pattern is configured based on a slot granularity.

In some implementations, the first CC and the second CC are configured with different numerologies.

In some implementations, the PUCCH carrier pattern is configured with periodicity.

Figure 5:
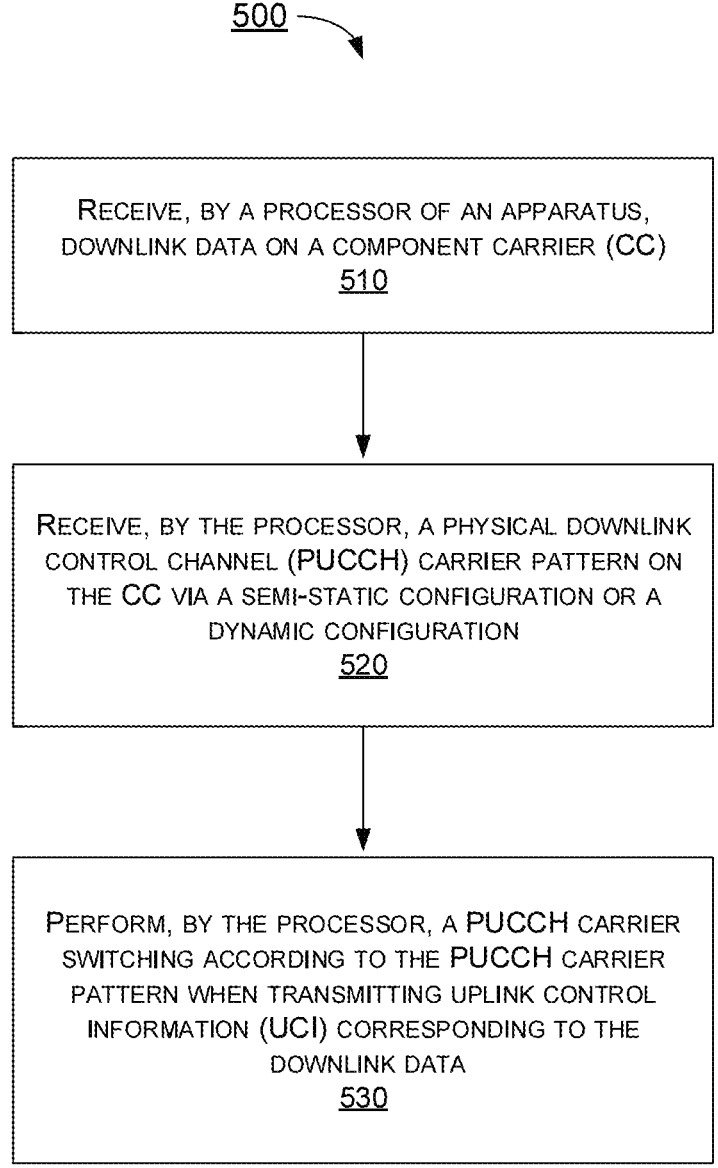
FIG. 5 is a flowchart of an example process in accordance with an implementation of the present disclosure.

FIG. 5 illustrates an example process 500 in accordance with an implementation of the present disclosure. Process 500 may be an example implementation of schemes described above, whether partially or completely, with respect to UCI transmission enhancement with the present disclosure. Process 500 may represent an aspect of implementation of features of communication apparatus 310. Process 500 may include one or more operations, actions, or functions as illustrated by one or more of blocks 510, 520, 530 and 540. Although illustrated as discrete blocks, various blocks of process 500 may be divided into additional blocks, combined into fewer blocks, or eliminated, depending on the desired implementation. Moreover, the blocks of process 500 may executed in the order shown in FIG. 5 or, alternatively, in a different order. Process 500 may be implemented by communication apparatus 310 or any suitable UE or machine type devices. Solely for illustrative purposes and without limitation, process 500 is described below in the context of communication apparatus 310. Process 500 may begin at block 510.

At 510, process 500 may involve processor 312 of apparatus 310 receiving downlink data on a CC. Process 500 may proceed from 510 to 520.

At 520, process 500 may involve processor 312 receiving a PUCCH carrier pattern on the CC via a semi-static configuration or a dynamic configuration. Process 500 may proceed from 520 to 530.

At 530, process 500 may involve processor 312 performing a PUCCH carrier switching according to the PUCCH carrier pattern when transmitting UCI corresponding to the downlink data.

In some implementations, process 500 may involve processor 312 applying the PUCCH carrier pattern periodically.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
receiving, by a processor of an apparatus, a physical downlink control channel (PDCCH) on a component carrier (CC) in a PUCCH cell group;
receiving, by the processor, downlink data on a physical downlink shared channel (PDSCH) on a CC in the PUCCH cell group scheduled by the PDCCH;
receiving, by the processor, a physical uplink control channel (PUCCH) carrier pattern semi-statically configured via a radio resource control (RRC) signal or dynamically configured via downlink control information (DCI); and
transmitting, by the processor, uplink control information (UCI) corresponding to the downlink data on a PUCCH on a CC according to the PUCCH carrier pattern.

2. The method of claim 1, wherein the PUCCH carrier pattern configures a primary cell (PCell) and a secondary cell (SCell) within the PUCCH cell group that can be used to transmit the PUCCH.

3. The method of claim 2, wherein the PUCCH carrier pattern is configured in a time domain.

4. The method of claim 3, wherein a plurality of slots are configured in the time domain, and the PUCCH carrier pattern indicates one of the primary cell (PCell) and the secondary cell (SCell) for at least one of the slots.

5. The method of claim 4, wherein each of the slots is mapping to at least one of the primary cell (PCell) and the secondary cell (SCell).

6. The method of claim 4, a length of the PUCCH carrier pattern is variable from 1 to a maximum number of the slots.

7. The method of claim 2, wherein the primary cell (PCell) and the secondary cell (SCell) are configured with different numerologies.

8. The method of claim 1, wherein the PUCCH carrier pattern is configured at slot granularity.

9. The method of claim 1, wherein the PUCCH carrier pattern is configured with periodicity.

10. A method, comprising:
receiving, by a processor of an apparatus, downlink data on a component carrier (CC);
receiving, by the processor, a physical uplink control channel (PUCCH) carrier pattern on the CC via a semi-static configuration or a dynamic configuration; and
performing, by the processor, a PUCCH carrier switching according to the PUCCH carrier pattern when transmitting uplink control information (UCI) corresponding to the downlink data.

11. The method of claim 10, further comprising:
applying, by the processor, the PUCCH carrier pattern periodically.

12. An apparatus, comprising:
a transceiver which, during operation, wirelessly communicates with a network node of a wireless network; and
a processor communicatively coupled to the transceiver to perform operations comprising:
receiving, via the transceiver, a physical downlink control channel (PDCCH) on a component carrier (CC) in a PUCCH cell group;
receiving, via the transceiver, downlink data on a physical downlink shared channel (PDSCH) on a CC in the PUCCH cell group scheduled by the PDCCH;
receiving, via the transceiver, a physical uplink control channel (PUCCH) carrier pattern semi-statically configured via a radio resource control (RRC) signal or dynamically configured via downlink control information (DCI); and
transmitting, via the transceiver, uplink control information (UCI) corresponding to the downlink data on a PUCCH on a CC according to the PUCCH carrier pattern.

13. The apparatus of claim 12, wherein the PUCCH carrier pattern configures a primary cell (PCell) and a secondary cell (SCell) within the PUCCH cell group that can be used to transmit the UCI.

14. The apparatus of claim 13, wherein the PUCCH carrier pattern is configured in a time domain.

15. The apparatus of claim 14, wherein a plurality of slots are configured in the time domain, and wherein the PUCCH carrier pattern indicates one of the primary cell (PCell) and the secondary cell (SCell) for at least one of the slots.

16. The apparatus of claim 15, wherein each of the slots is mapping to at least one of the primary cell (PCell) and the secondary cell (SCell).

17. The apparatus of claim 15, a length of the PUCCH carrier pattern is variable from 1 to a maximum number of the slots.

18. The apparatus of claim 13, wherein the primary cell (PCell) and the secondary cell (SCell) are configured with different numerologies.

19. The apparatus of claim 12, wherein the PUCCH carrier pattern is configured at a slot granularity.

20. The apparatus of claim 12, wherein the PUCCH carrier pattern is configured with periodicity.

* * * * *